United States Patent [19]

Toriumi et al.

[11] 4,033,684
[45] July 5, 1977

[54] MICROFICHE READER MEANS

[75] Inventors: Shiro Toriumi, Machida; Hiroshi Endo, Fuchu; Nobuo Ueda, Sagamihara; Seiichi Yamagishi, Tokyo, all of Japan

[73] Assignee: Minolta Camera Kabushiki Kaisha, Osaka, Japan

[22] Filed: Oct. 6, 1975

[21] Appl. No.: 620,198

[30] Foreign Application Priority Data

Oct. 11, 1974 Japan .............................. 49-117525

[52] U.S. Cl. .............................................. 353/27 A
[51] Int. Cl.² ........................................ G03B 23/08
[58] Field of Search ....................... 353/27 A, 27 R

[56] References Cited

UNITED STATES PATENTS

| 2,323,372 | 7/1943 | Bryce | 353/26 A |
|---|---|---|---|
| 3,528,735 | 9/1970 | Blutt et al. | 353/27 A |
| 3,671,116 | 6/1972 | Leutwer et al. | 353/27 R |
| 3,708,677 | 1/1973 | Volk et al. | 353/26 A |
| 3,751,152 | 8/1973 | Rinehart | 353/27 |
| 3,790,266 | 2/1974 | Ueda et al. | 353/27 R |

Primary Examiner—Steven L. Stephan

[57] ABSTRACT

A microfiche reader permitting automatic loading and unloading of a microfiche, and rapid, automatic location of a frame on the microfiche in response to keyed input, which is converted to electrical values supplied to drive a frame location device carrying the microfiche in required directions to a requisite setting.

5 Claims, 8 Drawing Figures

MICROFICHE READER MEANS

The present invention relates to a microfiche reader means. More particularly the invention relates to an improved microfiche reader means which permits automatic loading and unloading of a microfiche and automatic location of different frames in response to keyed input.

Due to massive increases in the amount of data made available in business and industry from various sources, and because of the consequent increased cost and problems of providing storage medium and storage space for this data, an increasingly popular medium for storage of data is microfilm, which permits recording of document contents in a considerably reduced size, and offers the advantages over storage of a document in full-size format that the size and weight of data storage medium are much less and that the medium may be stored or transported much more easily. To permit examination of the content of a document, the microfilm copy of the document must be placed in a means for magnification and projection onto a suitable screen or production of an enlarged copy of the reduced image carried by the microfilm. Two basic systems are employed for storage of a plurality of documents in microfilm form. Filing, or more particularly reclassification, of documents in both systems presents certain problems, since once established, the order of documents is fixed, or at least rearrangement is difficult. In one system documents are stored successively in their file order on a reel of tape, the documents being disposed in a single row or plurality of rows on the tape. This system has the advantage of extreme compactness, but since subsequent insertion of a new document in an intermediary position in the records is almost impossible in this system, the system is used to its best advantage when used for storage of documents having a completely established filing order, and is best suited to storage of files of considerable length, since otherwise it may be necessary to fill up a tape with a plurality of different files, which can give rise to problems relating to filing of the tapes themselves. In the other system film frames are disposed in rectangular arrays on sheets known as microfiches, a set of associated documents being grouped on one and the same microfiche. This system has slightly greater space requirements than the tape system but has the advantage that a certain modification of a file and insertion of new documents into a file are possible, since a particular frame on a microfiche can be removed or replaced without affecting other frames thereon, and a new microfiche carrying microfilm copies of documents can be inserted between microfiches previously provided in a file. This system is therefore used mainly for applications requiring comparatively constant revision of filing order, and is also used for storage of files which each comprise a comparatively small number of documents.

To obtain magnified reproduction of a frame of a microfiche, the microfiche must be placed in a reader apparatus having magnification, focussing and projection means, and positioned in a set position relative to these means. In conventional means this positioning of the microfiche must be mainly effected manually, which, because of the extreme reduction in size of a recorded document on a frame, is obviously time-consuming as well as requiring a moderate degree of manipulative skill of the user, even if mechanical means for assisting positioning of a microfiche are provided. In particular, if a frame is only slightly misplaced with respect to a magnification and projection system for projection of an enlarged, viewable version of the frame content onto a screen, a considerable portion of the frame content does not appear on the screen. In other words, the frame must be positioned with great accuracy, and it is desirable that a reader means include means for fine adjustment of the frame position. Of course, if only one document carrying a comparatively large amount of data is required, the time necessary for location and positioning of a frame is not a particular problem. However, as known, in practice it is frequently necessary to examine a plurality of documents in succession, and it is not necessarily the case that the entirety of each document must be examined, but it may simply be required to obtain one or two items of data from successive documents. In such a situation, location and positioning of successive frames carrying document contents requires an excessive amount of time in conventional means, and the difficulty of data retrieval has hitherto countered to a considerable extent the above cited advantages of storage of data in microfilm form.

In addition, it is frequently convenient if a microfiche reader can be provided as a terminal device of a computer system, and frame numbers be designated by the central processing unit. The relevant set-up in this case obviously becomes cumbersome or difficult to achieve if frame location must be effected manually.

It is accordingly a principal object of the invention to provide an improved microfiche reader means permitting easy and rapid retrieval of data.

It is another object of the invention to provide a microfiche reader means comprising a control system for automatically positioning a microfiche in response to simple keyed input.

It is a further object of the invention to provide a microfiche reader means permitting automatic loading and unloading of a microfiche.

In accomplishing these and other objects, there is provided according to the present invention, a microfiche reader means comprising a fixed magnification and projection means, frame location means which carries a microfiche and is movable to different positions to bring different frames of a microfiche carried thereby to a position for projection of a magnified image of the content thereof onto a viewing screen by the magnification and projection means, and loading and unloading roll means which automatically load a microfiche onto the frame location means in response to a signal from switches actuated by the microfiche itself upon partial insertion thereof into the reader means, and unloads the microfiche subsequent to actuation of an external key by the user. The frame location means comprises a slidable support which is movable in straight line motion only, and a carrier which is constrained to move in the line of motion of the slidable support but is also movable, independently of the slidable support, along a line normal to the line of slidable support motion, whereby upon suitable displacement of the slidable support and of the carrier any one of the frames of the microfiche may be brought to a requisite location for projection of the content thereof onto the viewing screen. To effect such displacement it is merely necessary for a user to key the number of the required frame on a keyboard and actuate a start key, whereupon the keyed input is converted to electrical values for drive of the slidable support and carrier the requisite amounts. There are also provided means for effecting slight displacement of the support and carrier independently of the keyed frame number input, thereby permitting fine adjustment of frame position. For viewal of another frame, it is simply necessary to key the number of the new frame, whereupon required displacement with respect to the previous frame is calculated and then effected. Thus, location of a frame may be effected exclusively by keying actions and the microfiche reader means of the invention presents the advantages of considerable economy of time and effort in the retrieval of data.

A better understanding of the present invention may be had from the following full description of several preferred embodiments thereof when read in reference to the attached drawings in which like numbers refer to like parts, and FIG. 1 is a perspective view, partly cut-away, showing general features of a microfiche reader means according to the invention;

The description will proceed first in reference to the construction and operation of the means of the invention, and subsequently in detailed reference to electronic circuit means for control of this action.

Figure 1:
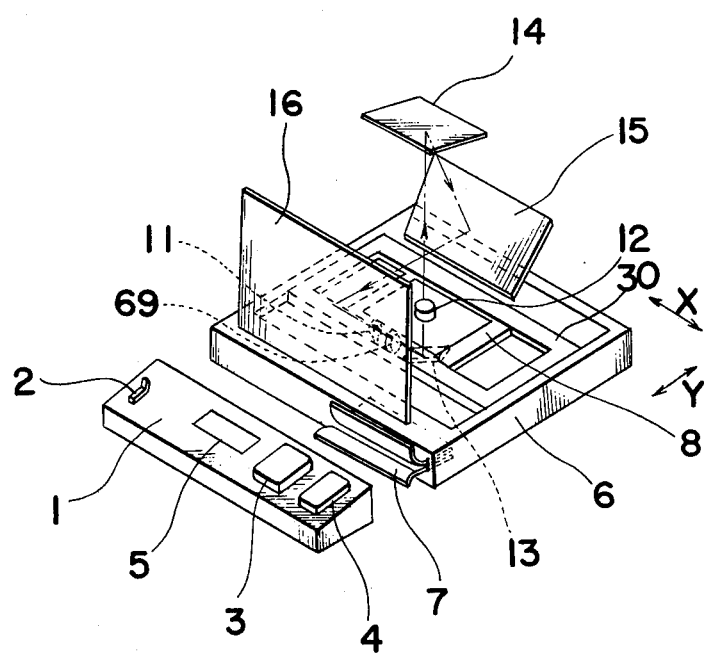

Referring to FIG. 1, there is shown an example of a microfiche reader according to the invention which comprises a control panel 1 on which there is provided a power connection switch 2, closure of which connects power to the whole microfiche retrieval system and causes a light source 11 to light up, key assembly 3 for designation of the number of a required frame of a microfiche, a set of keys 4 for start, return, or fine adjustment movement of a microfiche carrier in a manner described more fully below, and an indicator 5 showing the number of a frame in a position for viewing. A microfiche containing a frame to be viewed is inserted into the reader via a pair of guide plates 7 which are disposed horizontally, are curved oppositely with respect to one another, in order to facilitate microfiche insertion, and guide the microfiche onto a frame location means constituted by a slidable support 30 and carrier 8. The slidable support 30 is slidably mounted on the fixed base 6 of the microfiche reader and may slide only along a line which extends from front to rear with respect to the microfiche reader, and is referred to below as the Y axis. The carrier 8, which actually holds the microfiche, is constrained by the slidable support 30 to move along the Y axis, but is free to move with respect thereto along an X axis, which is normal to the Y axis. Movement of the carrier 8 holding the microfiche requisite distances along the X and Y axes brings a required microfiche frame to below a focussing lens 12, or lens system. This lens 12 is provided in a generally central position with respect to the frame 6, and the frame 6 covers an area somewhat larger than four times the area of a microfiche, thus permitting every frame of the microfiche to be brought to below the lens 12. In the description below, the position directly below the lens 12 will be referred to as the veiwal position. When a required frame is brought to the viewal position a shutter 69 provided below the slidable frame 30 is opened, whereupon light from a light source 11, which is actuated upon closure of switch 2, and is generally level with the shutter 69 is directed onto an inclined mirror 13 also provided below the frame 30. The mirror 13 directs light from the light source 11 upwards through the required microfiche frame to the lens 12, which directs a focussed image of the contents of the microfiche frame onto a mirror 14. The image is directed by the mirror 14 onto a mirror 15 and thence onto a vertical or approximately vertical viewing screen 16 provided in a forward portion of the microfiche reader. The elements 11 through 16 and shutter 69 are all held in fixed positions in attachment to suitable portions of the microfiche reader housing or base, not shown. Needless to say, the screen 16 may be replaced by photocopy or other known means for obtaining a copy of the content of a microfilm frame.

Figure 2:
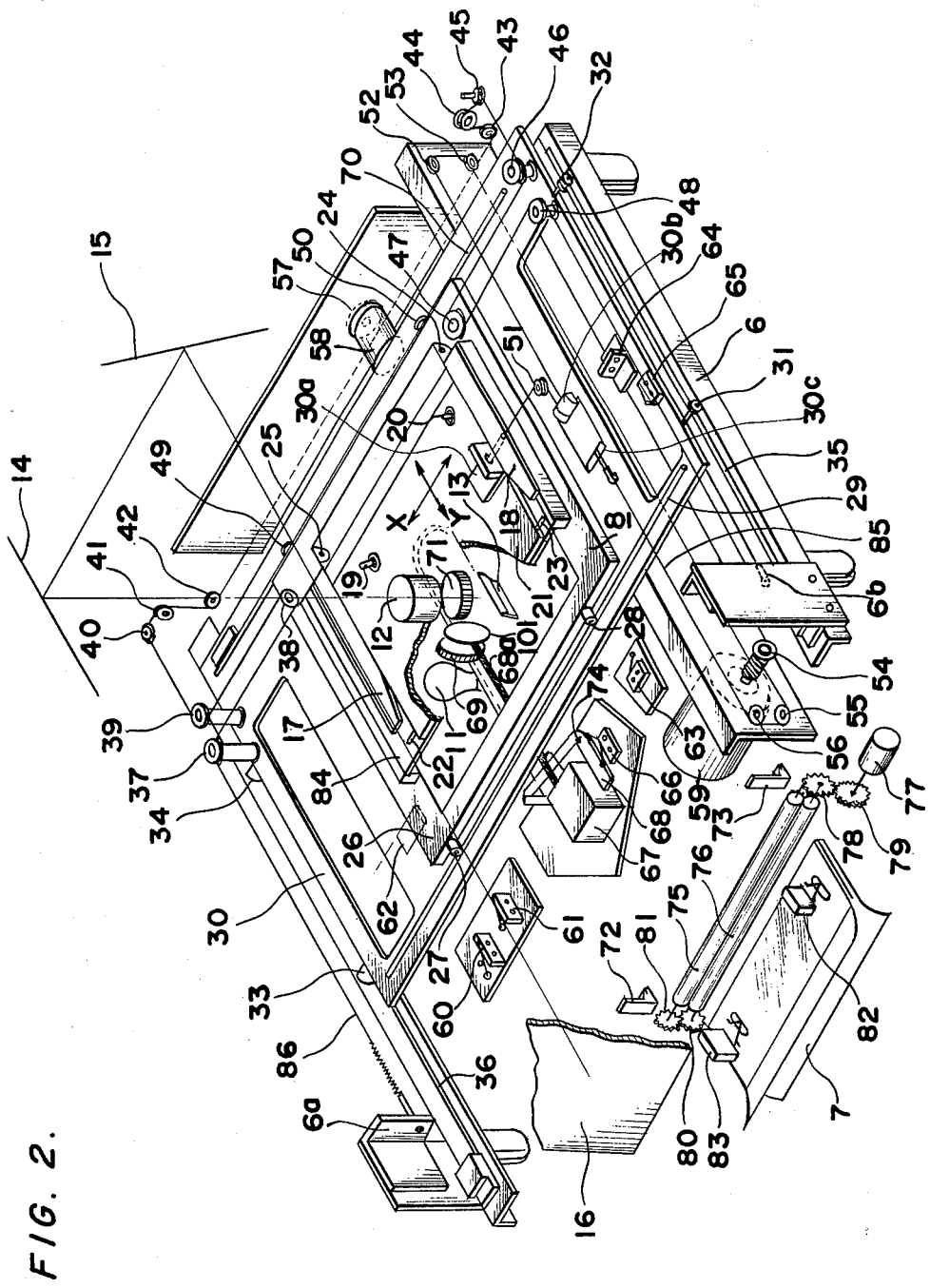
FIG. 2 is a perspective view showing details of the construction of the means of FIG. 1.

Construction of the microfiche reader and retrieval means is shown in greater detail in FIG. 2, to which reference is now had. Upon correct insertion of the microfiche into the guide 7, two switches 82 and 83 are closed by the microfiche. The switches 82 and 83 are so spaced that closure thereof cannot be effected by an incorrectly inserted microfiche, that is a microfiche inserted with a short side instead of a long side thereof foremost. Closure of both switches 82 and 83 results in emission of a signal to a control circuit 87, not shown in FIG. 2, which thereupon starts a motor 77. Acting through gears 78 and 79, the motor 77 supplies forward drive to a pair of rolls 75 and 76 which are disposed horizontally immediately behind the guide 7, i.e., with respect to the reader apparatus, slightly inwards of the guide 7, and which when receiving forward drive rotate in a direction to draw the microfiche to the interior of the reader apparatus and onto the frame location means, which at this time is positioned immediately behind the rolls 75 and 76. The rolls 75 and 76 may also be driven in reverse to move the microfiche to the exterior of the reader apparatus, as described below.

After a time sufficient for the microfiche to have been moved completely onto the frame location means, the control circuit 87 stops the motor 77, and hence action of the rolls 75 and 76.

The slidable support 30 is a rectangular element having a central opening and having provided on opposite short sides thereof rollers 31 through 34, there being two rollers on each short side. The rollers 31 through 34 roll along guide rails 35 and 36 in opposite side portions of the fixed base 6, whereby the support 30 moves and is guided along the Y axis, movement of the support 30 being effected by a pulse motor 59 acting through a draw wire 85. The wire 85 has one end fixedly attached through a spring, or other suitable means for maintenance of wire tension, to a portion 30a of the fixed base 6, is led from this fixed portion in a line parallel to the X axis, is turned 90° and passed around a pulley 51 mounted on the lower surface of the slidable support 30, passed round a slide portion of a fixture 30b attached to the lower surface of the support 30, then is led back and is subsequently passed around pulleys 52, 53, 55 and 56, which are mounted on the fixed frame 6 at the corners of an imaginary rectangle, the wire 85 thereby defining a loop parallel to the Y axis, and the opposite end of the wire 85 is fixedly attached to a fixture 30c attached to the lower surface of the support 30. In the loop portion defined by the pulleys 52, 53, 55 and 56, the wire is wound around a shaft 54 which is turned by the pulse motor 59, the slidable support 30 being moved along the Y axis a distance determined by the number of pulses supplied to motor 59. The construction of motor 59 and diameter of shaft 54 are such that for each pulse supplied to motor 59 the support 30 is moved one 'Y unit', which is a distance equal to one microfiche frame width.

The carrier 8 comprises a slide frame 26, transparent rest 21, and transparent press 84. The slide frame 26 has a central open portion, and is fitted with rollers, 49, 50, 27 and 28 which roll along guide rails 29 and 70 disposed parallel to the X axis along edge portions of the long sides of the slidable support 30, whereby the carrier 8 is moved along the X axis independently of the support 30. The transparent rest 21 is horizontal and fixedly held in the slide frame 26. On opposite short sides of the rest 21 there are provided guide wall-and-cover elements 17 and 18 which are disposed parallel to the line of advance of the microfiche during loading or unloading thereof, and serve to ensure correct movement of the microfiche during such advance. Near the rear edge of the rest 21 there are provided two stop pins 19 and 20 which are disposed in a line parallel to the Y axis, are contacted by the leading edge of a microfiche loaded into the reader, and serve to ensure correct positioning of the loaded microfiche. The transparent press 84 is pivotally attached to the rest 21 or frame 26 by means of pivot pins 24 and 25 provided at the rear corners thereof, and has provided at or near the front corners thereof outwardly extending pins 22 and 23. When the frame location means is brought immediately adjacent to the rollers 75 and 76, in a position referred to below as the loading/unloading position, the pins 22 and 23 ride up on fixed wedge elements 72 and 73 with sloping portions provided near opposite ends of the rollers 75 and 76, whereby the press 84, pivoting on the pins 24 and 25, is raised, thus allowing unhindered forwarding of a microfiche onto the rest 21. When the frame location means is moved rearwardly away from the loading/unloading position, in a manner described below, the pins 22 and 23 are moved out of contact with the wedge elements 72 and 73 and the press 84 is allowed to move gradually downward under its own weight, and to press down on and maintain good flatness of the microfiche on the rest 21.

When the frame location means is returned to the loading/unloading position, the press 84 is again raised due to the pins 22 and 23 riding on the wedge elements 72 and 73, whereby the microfiche may be withdrawn from the rest 21 smoothly and without hindrance. The carrier 8 is movable along the X axis on the slidable support 30 by a pulse motor 58 acting through a wire 86. One end of the wire 86 is attached through a suitable spring element for maintenance of tension to a left-hand forward portion 6a of the fixed base 6, as shown in the leftmost portion of FIG. 2. From there the wire 86 is led rearwards, turned 90° around a pulley 37 mounted on the slidable support 30 passed around a pulley 38 mounted on the slide frame 26, led back and turned 90° around a pulley 39 mounted on the slidable support 30, passed around a direction and level changing pulley assembly consisting of pulleys 40 through 42 mounted on a rear left-hand corner portion of the base 6, led parallel to a rear edge portion of the base 6 wound around the output shaft 57 of the pulse motor 58, passed around a direction and level changing pulley assembly constituted by pulleys 43 through 45 mounted on a rear right-hand corner portion of the base 6, led to and turned 90° around a pulley 46 mounted on the slidable support 30, passed around a pulley 47 mounted on the slide frame 26, led back towards the right-hand edge of the slidable support 30, turned 90° around a pulley 48 mounted on the support 30, and then led forwards to the front right-hand portion 6b of the base 6, to which the other end of the wire 86 is fixedly attached. Since the length of the wire 86 is constant, upon rotation in one direction or the other of the shaft 57 by the pulse motor 58 the slide frame 26, and hence rest 21 and press 84 and the microfiche held thereby, are moved along the X axis, independently of the slidable support 30, and irrespective of the location of the support 30 on the Y axis, the slide frame 26 being moved one 'X unit', which is a distance equivalent to the length of one frame of the microfiche, for each pulse supplied to pulse motor 57. Movement of the carrier 8 along the X axis may be easily effected simultaneously with movement of the slidable support 30 along the Y axis, since during movement of the support 30 the pairs of pulleys 37 and 39 and 46 and 48 carrying the wire 86 for movement of the slide frame 26 always travel in straight lines, and there is simply a change of the lengths of wire 86 between these pairs of pulleys and the front and rear corners of the base 6, the distances between these pairs of pulleys and the pulleys 38 and 47 mounted on the slide frame 26, i.e., the location of the carrier 8 on the X axis being determined solely by the rotational position of the shaft 57. Thus, starting from any position of the frame location means, by causing movement over a requisite distance and in a requisite direction of the carrier 8 along the X axis and of the slidable support 30 along the Y axis any frame of a microfiche carried by the carrier 8 may be brought to the viewal position, i.e., to below the lens 12. Such movement is effected by a control means described below, which determines the number of frame lengths the frame location means is required to be moved in particular directions along the X and Y axes, counts pulses to the motors 58 and 59, and stops the motors 58 and 59 after a requisite displacement of the frame location means, and which also detects when the required frame has been brought to the viewing location and thereupon energizes a solenoid and plunger assembly 67. The plunger of assembly 67 is connected to a linkage element 68 which is pivotally mounted on a pin 74 and is connected to an extension rod 68a connected to the abovementioned shutter 69 between the light source 11 and mirror 13. Upon energization of the solenoid and plunger assembly 67, the linkage element is pivoted in a direction to cause opening of the shutter 69, whereby light from the light source 11 can impinge on the mirror 13 and be reflected thereby upwardly through the required frame to the lens 12, and the content of the frame is displayed on the screen 16.

Referring to FIGS. 1 and 2, the action of microfiche loading and unloading and location of microfiche frames is as follows. It is assumed for simplicity that the microfiche contains 10 × 8 frames disposed in a 10 frame - column (X axis) and an 8 frame - line (Y axis) arrangement and numbered from left to right in successive lines starting from the top line, it being evident that this is an unrealistically low number of frames and that frames may be numbered in a different manner. It is also assumed that it is required to view Frame No. 25 and Frame No. 18, in that order. After actuation of power connection switch 2, the microfiche is loaded by rolls 75 and 76 onto the frame location means at the loading/unloading position as described above. Then the number '25' is keyed on the key assembly and a start key which is a key in the set of keys 4 is pressed. The order of action i.e., microfiche loading, frame number keying, start key depression, permits use of a comparatively simple circuit although it is of course possible to provide suitable storage and holding circuits permitting the frame number to be keyed before loading of the microfiche, for example. When the frame location means is at the loading/unloading position, a projection extending from the lower surface of the slide frame 26 actuates a switch 65 for preventing input to the pulse motor 58 and stopping movement along the X axis, and the slidable support 30 similarly actuates a switch 63 for preventing input to the pulse motor 59 and stopping movement along the Y axis. The switches 63 and 65 are rendered ineffective upon depression of the start key, and remain ineffective until depression of a return key, the action of which is described later, this being achievable for example by passing pulses to the motor 58 or 59 through a parallel circuit having in one branch a normally closed contact controlled by switch 63 or 65 and in the other branch a normally open contact controlled by the start switch in series with a normally closed contact controlled by the return switch. Depression of the start switch also causes emission of a signal to the control circuit 87, which in response causes pulses to be supplied to the Y axis motor 59, but not to the X axis motor 57, whereby the carrier 8 remains stationary with respect to the slidable support 30, and the frame location means is moved along the Y axis only, away from the loading/unloading position, to an index position, which is a position wherein Frame No. 1 is at the viewal position below the lens 12. During this movement pulses to the Y axis motor are not counted. Upon arrival of the frame location means at the index position, a lower projection of the slidable frame 30 actuates a switch 62, whereupon a signal is supplied to the control circuit 87, which in response closes the pulse counting circuits of both motors 58 and 59, and also closes the pulse supply circuit to the X axis motor 58. Since the microfiche constitutes a 10 × 8 array of frames, to bring Frame No. 25 to the viewal position the slidable support 30 must be moved two Y units rearwards as seen in FIG. 2 and the carrier 8 must be moved four X units, to the left as seen in the drawing. This is effected by supplying two pulses to motor 58 and four pulses to motor 59, and actuating the motors 58 and 59 in forward drive, which is defined as drive to move the carrier 8 and slidable support 30 to higher number rows and columns respectively. These pulses are counted and the motors 58 and 59 are stopped after receiving the requisite number of pulses, whereby Frame No. 25 remains at the viewal position, the shutter 69 being opened and the content of Frame No. 25 being displayed on the screen 16 as described earlier. After examination of the content of Frame No. 25, the user keys the number '18' on the key assembly 3, whereupon motor 58 is driven in forward drive and has three pulses supplied thereto, and motor 59 is driven in reverse drive and has one pulse supplied thereto, thus brining Frame No. 18 to the viewal position. Needless to say, positioning of frames at the viewal position is effected in basically the same manner if the number of pulses required to be supplied to motor 58 or 59 in order to move the frame location means one X unit or one Y unit is an integral number other than one.

Upon depression of the return key both motors 58 and 59 are driven in reverse, and counting of pulses is discontinued, the carrier 8 being moved rightwards as seen in FIG. 2, and the slidable support 30 forwards, and the frame location means as a whole being moved towards the index position. When the carrier 8 nears its rightmost position, a projection on the lower surface of slide frame 26 actuates a switch 64 which causes action of motor 58 to be slowed, thus decelerating carrier 8, and when carrier 8 reaches its rightmost position, a projection on the lower surface of frame 26 actuates a switch 65, which stops supply of pulses to motor 58, whereby movement of carrier 8 is stopped. As slidable support 30 moves forwards projections on the lower surface thereof successively actuate switches 61, 60, and 63, which are respectively for temporary stopping, slowing, and stopping of support 30. If slidable support 30 actuates switch 61 before slide frame 26 actuates stop switch 65, as would be the case for example in return movement of the frame location means from a setting in which Frame No. 18 is at the viewal position, supply of pulses to Y axis motor 59 is temporarily stopped, whereby the frame location means is moved along the X axis only. Upon closure of switch 65 by slide frame 26, supply of pulses to Y axis motor 59 is resumed, irrespective of the actuation of switch 61, and the frame location means is thereupon moved forwards along the Y axis, is slowed upon actuation of switch 60, and is stopped upon actuation of switch 63, the frame location means now being at the loading/unloading position. It will be noted that braking and stopping of the carrier 8 and slidable support 30 are effected gently due to the action of braking switches 64 and 60 respectively. Actuation of stop switch 63 also causes supply of a signal to control circuit 87, which in response causes motor 77 to drive rolls 75 and 76 in reverse, whereby the microfiche is moved out through the guide 7, the switches 82 and 83 being closed during this movement. The microfiche is moved outwards until its rear edge just contacts rolls 75 and 76 and the central portion thereof is supported by guide 7. Subsequent removal of the microfiche by the user causes switches 82 and 83 to open, whereupon motor 77 is stopped and the system is reset.

The control unit 87, which is not shown in detail, may have various known constructions, and must of course be able to distinguish whether the loading/unloading rollers 75 and 76 are to be rotated in forward or reverse drive, and also, when start button 4a is pressed, whether a microfiche has just been loaded and the frame location means is at the loading/unloading position or whether the frame location means has already been moved to a setting at which a microfiche frame has been brought to the viewal position. These distinctions may be easily made as follows. Forward drive of rollers 75 and 76 in order to load a microfiche is dependent on the presence of a signal from switches 82 and 83 near the guide 7 and absence of a signal from the return key and reverse drive may be initially dependent on the presence of a signal from the return key and then on the presence of a signal from the return key stop switch 63 for stopping slidable support 30, and switches 82 and 83, drive to the rollers 75 and 76 being stopped upon removal of a microfiche and termination of the signal from switches 82 and 83 as described above, or reverse drive may be initiated by a signal from the return key and maintained long enough for the microfiche to be moved from any position within the reader apparatus to the unloading position and moved by the rolls 75 and 76 through the guide 7. The general position of the frame location means is detected simply by the above-mentioned switch 63 for stopping slidable support 30. If switch 63 is closed when the start key is actuated, it is known that the frame location means is at the loading/unloading position, and slidable support 30 is therefore moved until closure of the above-mentioned switch 62 is effected. As soon as the frame location means leaves the loading-/unloading position switch 63 is opened, whereby when it is required to view a different frame on the same microfiche and the start key is again actuated after keying of the new frame number, it is detected that the frame location means is already in a position for holding a microfiche frame at the viewal position, and necessary movement along both the X axis and Y axis is effected immediately, pulses to motors 58 and 59 being counted.

Figure 3:
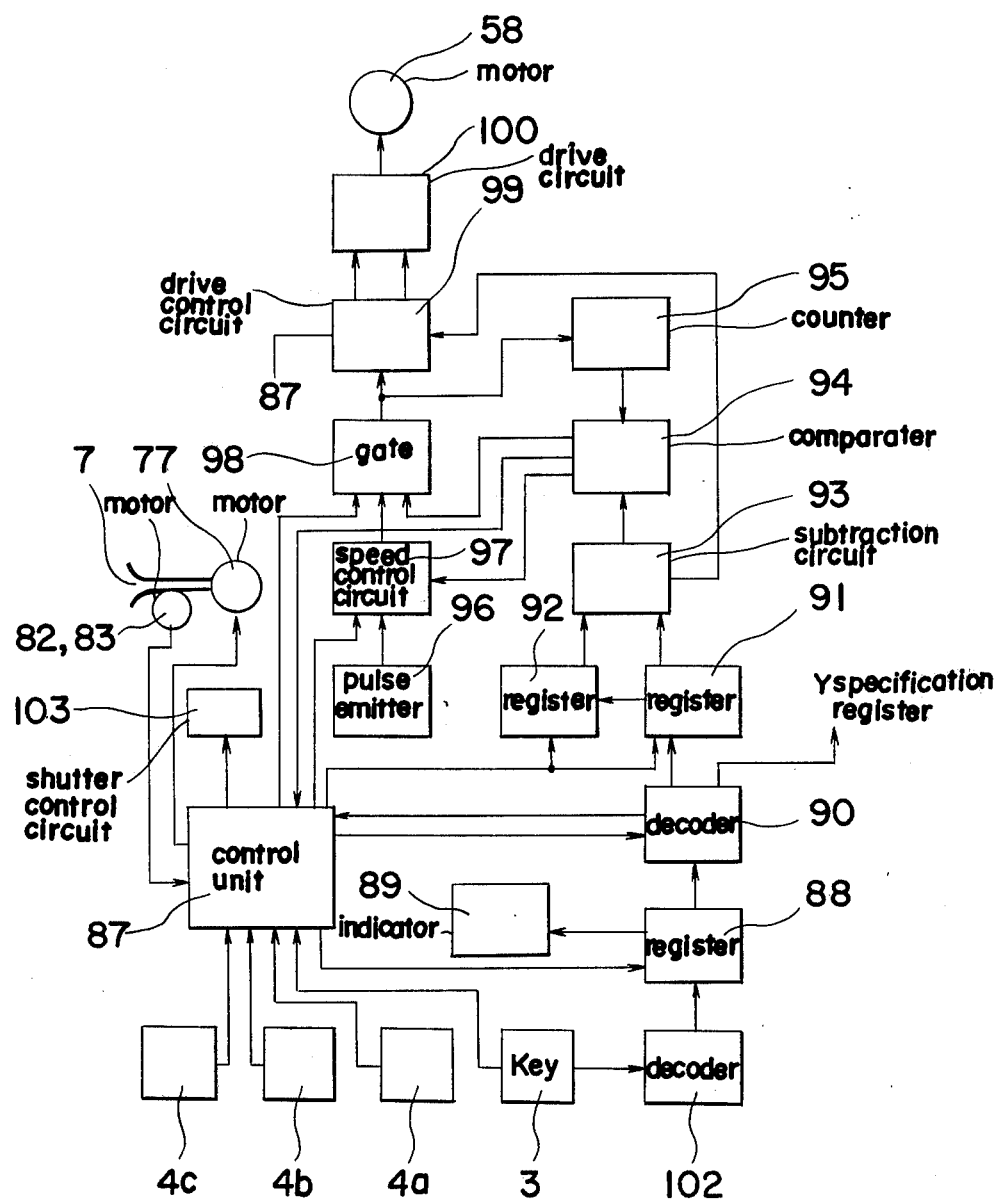
FIG. 3 is a block diagram of a control circuit for microfiche frame location according to one embodiment of the invention.

Circuit means for achieving the above-described location of frames is shown in block diagram form in FIG. 3, to which reference is now had. FIG. 3 shows only the circuit portion relating to X axis movement, it being understood that circuit construction and action relating to Y axis movement are identical except that the control unit 87 acts to cause drive of the slidable support 30 between the loading/unloading position and the index position while input to the X axis motor 58 is stopped, as described above. The motor 77 for the rolls 75 and 76 is actuated by the control unit 87 upon receipt by control unit 87 of input from a two-input AND gate receiving input from switches 82 and 83. The motor 77 remains actuated for a set time after termination of this input to control unit 87. The number of the first required frame is keyed in on the key assembly 3, the content of which is supplied to a decoder 102 for conversion thereof from a decimal to a binary-coded decimal format, while at the same time a signal indicating that a frame number has been keyed is supplied to control unit 87, this signal being added to a signal from the start button 4a actuated later. Decoder 102 content is supplied to and stored in an input register 88, which supplies corresponding output to an indicator 89 which permits the user to check that the correct number has been keyed, and to a decoder 90 which converts the value into corresponding values of X and Y coordinates, e.g. for Frame No. 18, column 2 for the X axis and line 8 for the Y axis, if film frames are disposed in a 10 × 3 array, column 2 for the X axis and line 3 for the Y axis if frames are disposed in an 8 × 10 array, and so on for other arrays. Upon completion of decoding, decoder 90 supplies a signal indicating completion to control unit 87 which emits a signal ordering decoder 90 content relative to the X axis to be set in an X coordinate specification register 91, Y axis data being similarly supplied to a Y coordinate specification register not shown. X coordinate register 91 content is supplied to a subtraction circuit 93 which also receives input from a register 92 storing the X coordinate value of the previously selected frame of a particular microfiche. When a microfiche is initially loaded into the reader, control unit 87 sets a "1" in previous frame register 92. The absolute value of the result obtained by subtraction circuit 93 is supplied to a comparator 94, and the sign of the result is sent to a forward and reverse drive control circuit 99, which causes reverse drive of motor 58 if the sign is minus and forward drive thereof if the sign is plus. Comparator 94 compares subtraction circuit 93 input with input from a pulse counter 95.

Pulses to drive X axis motor 58 are emitted constantly by a pulse emitter 96 subsequent to actuation of start button 4a, and are supplied through a speed control unit 97, a gate 98, forward and reverse drive control circuit 99 to a drive circuit 100, which drives motor 58.

As well as being supplied to drive control circuit 99, pulses exiting from gate 98 are also supplied to pulse counter 95. Upon coincidence of inputs from pulse counter 95 and subtraction circuit 93, comparator 94 supplies a signal to close gate 98 and so stop motor 58. At the same time comparator 94 also sends a signal indicative of coincidence to control unit 87. This signal is maintained until designation of another frame by means of the key assembly 3. Upon receipt of a corresponding signal from the comparator for Y axis movement, control unit 87 supplies actuating input to a shutter control circuit 103, and circuit 103 causes energization of the solenoid and plunger assembly 67, thereby opening shutter 69. Thus, if the value of the X coordinate of the previously selected frame were "2" and that of the currently required frame "8", the result obtained by subtraction circuit 93 would become "+6". In such a case, drive control circuit 99 causes forward drive to motor 58, which moves carrier 8 leftwards as seen in FIG. 2 until the count of pulse counter 95 supplied to comparator 94 reaches "6" and gate 98 is closed, shutter 69 being opened when slidable support 30 reaches the required Y axis coordinate.

The speed control circuit 97 receives input from comparator 94 and control unit 87. The control unit 87 causes drive speed to be reduced during start of motor 58, i.e., just after actuation of start key 41, to avoid problems of starting torque. Comparator 94 supplies input to cause reduction of speed when the difference between the values of input from pulse counter 95 and subtraction circuit 93 becomes lower than a certain value, in order to avoid excessively sudden stopping and possible overshooting of carrier 8.

Figure 4:
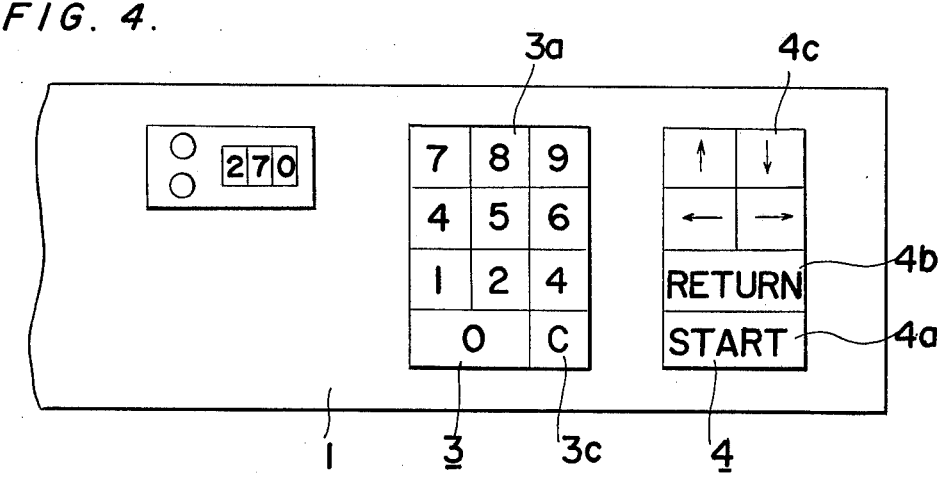
FIG. 4 is an example of the control panel layout suitable for use in association with the control circuit of FIG. 3.

It is evident, however, that continued employment of the reader apparatus over a considerable period of time will almost inevitably be accompanied by a certain variation of tension in the wires 85 and 86 by which the slidable support 30 and carrier 8 are drawn along the Y axis and X axis, with the result that even if pulses are correctly delivered to motors 58 and 59 required frames may not always be brought exactly to the viewal position. If a required frame is slightly displaced with respect to the viewal position, with the result that part of the content thereof is not projected on screen 16, fine adjustment of the position of the frame may be effected by depression of a suitable key 43, of which there are four, as shown in FIG. 4, which shows an example of control panel layout, and in which the arrowed keys are keys 43, the arrow on each key indicating the direction in which the frame location means is moved during depression of the key. If, for example, the left-hand portion of a frame fails to appear on screen 16, the lower right-hand key 43, as seen in the drawing is depressed. While this key is depressed, signals are supplied to control unit 87 which in response supplies input causing speed control circuit 97 to lengthen the period of output pulses, opens gate 98, and causes direction control circuit 99 to function in forward drive mode, whereby carrier 8 is moved slowly forwards, i.e. rightwards as seen in FIG. 2. During this action pulses are not counted by counter 95. When the entirety of the required frame is visible on screen 16, the key 43 is released, thus terminating input to motor 58 and halting carrier 8. Reverse movement of carrier 8 or forward or reverse movement of slidable support 30 may be effected in a similar manner by depression of the relevant key 43. Still referring to FIG. 4, a suitable arrangement for the key assembly 3 for use in association with the above-described embodiment is, as shown in the drawing, a simple rectangular array of keys which are numbered decimal "0" to "9", and include a clear key. With this array, the highest order figure of the number of the required frame is keyed first, followed by successively lower order figures of the number.

Referring back to FIG. 3, after viewal of a frame on a microfiche, keying of the number of another frame on the microfiche and depression of the start key 41 results in signals from control unit 87 to effect initial resetting of all circuits followed by setting of the content of frame designation register 91 in previous frame register 92, and conversion of key assembly 3 content by D-BCD converter 102, subsequent action being as described above. Upon depression of the return key 4b all register circuits are cleared, and pulses are supplied, without being counted, to X axis motor 58 and Y axis motor 59 in accordance with closure of the abovedescribed switches 60 through 63, action of the entire circuit being terminated upon opening of switches 82 and 83 consequent to withdrawal of the microfiche from the reader.

Figure 5:
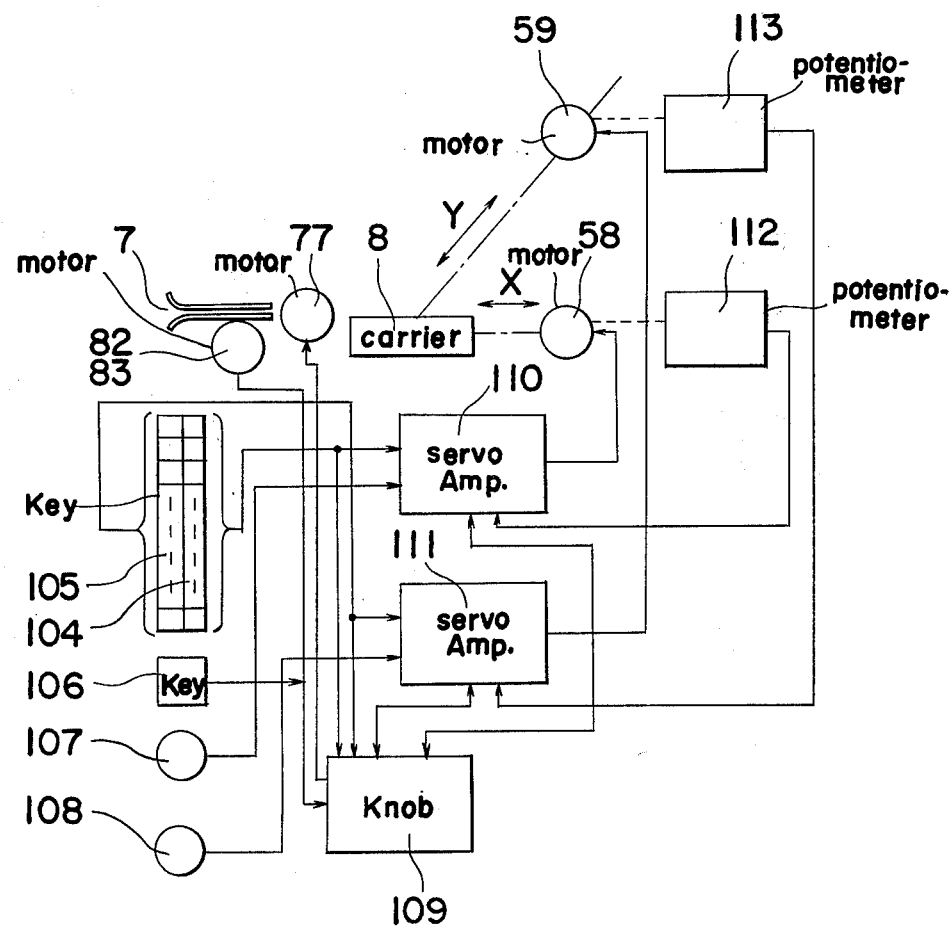
FIG. 5 is a block diagram of a control curcuit for microfiche frame location according to another embodiment of the invention.
Figure 6:
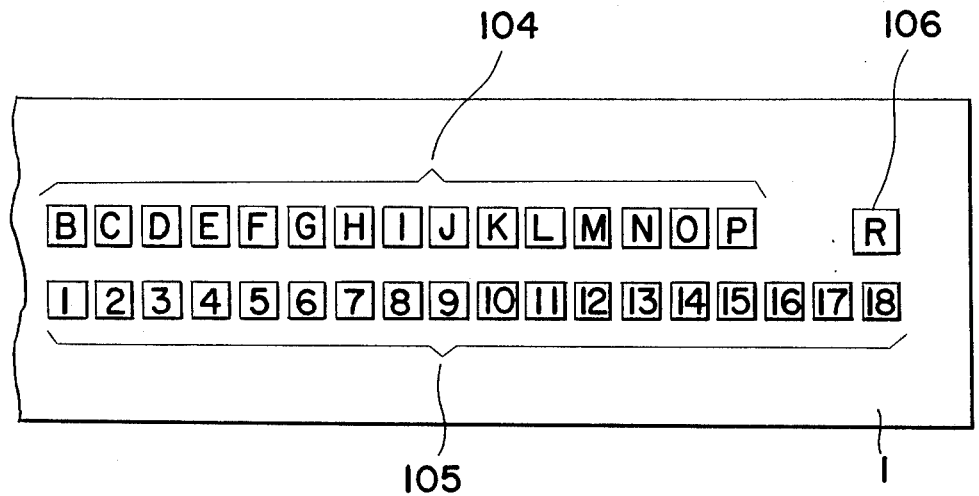
FIG. 6 is an example of the control panel layout suitable for use in association with the control circuit of FIG. 5.

According to another embodiment of the invention instead step-wise positioning of the frame location means, positioning may be effected by an analog control means such as shown in FIG. 5, to which reference is now had. In this means, a frame number is specified by a combination of one of a set of letters marked on a bank of keys 104 and one of the numbers marked on a bank of keys 105, a layout of such banks of keys being illustrated in FIG. 6, and bank 104 input corresponding to an X axis coordinate and bank 105 input to a Y axis coordinate. Still in FIG. 5, depression of particular keys on the banks 104 and 105 results in supply of input of specific levels of voltage to servo amplifiers 110 and 111, respectively. Servo amplifier 110 and servo amplifier 111 respectively supply drive input to X axis motor 58 and Y axis motor 59, which in turn drive shafts controlling sliders of potentiometers 112 and 113, respectively. Potentiometers 112 and 113 are associated with suitable reference voltages which are fed back via potentiometers 112 and 113 to the servo amplifiers 110 and 111 which continue to drive motors 51 and 59 until there is balance between input and feedback voltages, i.e., until the frame location means is in the correct position to bring the specified frame to the viewal position, whereupon signals indicating balance are supplied to a control unit 109, which in response causes opening of the shutter 69.

Figure 7:
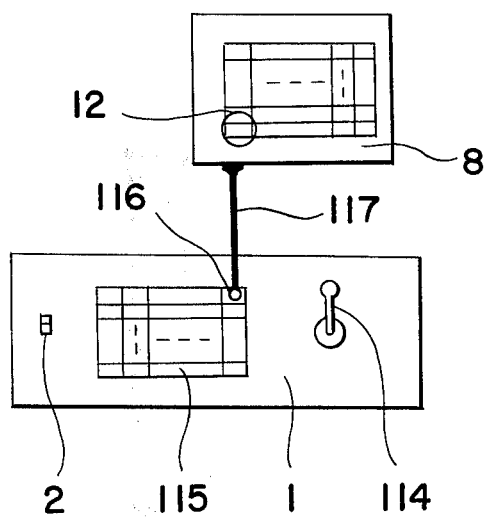
FIG. 7 is an example of a frame position indicator means.

Referring to FIG. 7, indication of the number of the frame currently at the viewal position may be effected for example by an arm 117 affixed at one end to the carrier 8 and carrying at the other end thereof a small lamp 116 which is moved below a transparent sheet 115 made of plastic or other suitable material which is covered by a suitable magnification means and is divided into a number of rectangles equal to the number of frames on a microfiche and numbered in correspondence thereto. As the frame location means is moved, the lamp 116 is correspondingly moved, and is brought to a position in which it illuminates the number on the sheet 115 which is the same as the number of the microfiche frame which is at the viewal position.

Figure 8:
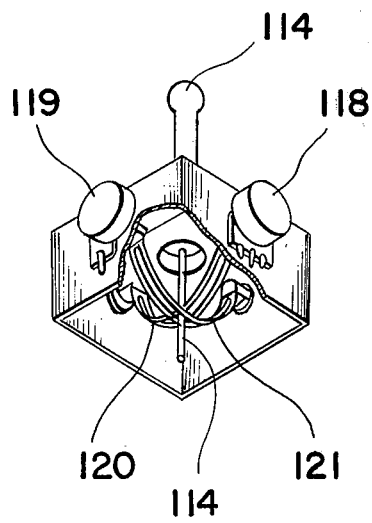
FIG. 8 is a perspective view, partially cut-away, of a means associable with the control circuit of FIG. 5 for fine adjustment of frame position.

Referring back to FIG. 5 and also referring to FIG. 8, in order to effect fine adjustment of the position of a microfiche frame there is provided small lever 114 which extends above the control panel 1 and is actuable by the user, and extends through slots formed in semicircular yoke elements 120 and 121 which are provided below the level of the control panel 1 and are disposed crosswise at right-angles to one another. The yoke element 120 has one end pivotally mounted on a suitable fixed wall and the other end thereof is fixedly connected to a knob 118. The yoke element 121 is similarly mounted and connected to a knob 119. There being slots formed in each yoke element 120 and 121, the lever 114 may be moved freely, and when moved it causes pivotal movement of one or both the yoke elements 120 and 121 resulting in rotation of one or both the corresponding knobs 118 and 119. The knobs 118 and 119 control the sliders of potentiometers 107 and 108 respectively which are associated with suitable supplementary voltage sources which may supply input to the servo amplifiers 110 and 11 via the potentiometers 107 and 108 respectively. When the lever 114 is vertical the servo amplifiers 110 and 111 receive no supplementary input and the frame location means remains stationary. If however the lever 114 is moved out of a vertical alignment, the slider of potentiometer 107 or 108 is moved due to movement of knob 118 or 119, thus creating unbalance in servo amplifier 110 or 111, resulting in movement of the frame location means along the X axis or Y axis.

It is believed that the advantages of the present invention will be apparent from the foregoing description. With the means of the invention loading of a microfiche is effected automatically and successive frames thereon may be located rapidly and easily by a simple keying procedure. It has been found that, using the means of the invention, after initial loading of a microfiche less than 2 seconds is required to move the microfiche from a setting for viewal of any frame thereof to a setting for viewal of any other frame thereof. This is a considerable improvement in terms of information retrival time demanded in conventional microfiche reader means, and a user may thus locate successive documents rapidly, and also with a minimum of fatigue.

Needless to say, whereas the invention has been described and shown above with reference to several preferred embodiments thereof many modifications which do not depart from the scope and principles of the invention are possible and are contemplated. There is no intention therefore to limit of the invention to the exact details shown and described.

What is claimed is:

1. A microfiche reader apparatus which comprises:
a frame location means including a slidable support table movable in a first direction and a carrier table movably mounted on said slidable support table and movable in a second direction which is orthagonal to said first direction;
a first pulse motor, first drive transmission means coupled between said first pulse motor and said slidable support table for moving said slidable support table in said first direction, a second pulse motor, a second drive transmission means coupled between said second pulse motor and said carrier table for moving said carrier table in said second direction;
means for inserting a microfiche having a plurality of frames in a rectangular array, said inserting means being positioned adjacent said frame location means and including a pair of microfiche detecting means in a path through which the microfiche is inserted and a transporting means for transporting the microfiche in said path and onto said carrier table, said transporting means being coupled to said detecting means and being operable to transport the microfiche only when both of said pair of detecting means are actuated by the leading end of the microfiche, said frame locating means being brought to an inserting position immediately behind said transporting means for taking in the microfiche onto the carrier table upon insertion of the microfiche;
a projection means adjacent said frame location means for projecting a specific frame of the microfiche onto a screen;
a key means for specifying a specific frame of the microfiche;
control means coupled with said key means and said pulse motors for controlling the movements of said frame locating means and including decoder means for converting values specified by said key means into values corresponding to coordinates of said first and second directions, respectively;
a pair of subcontrol means coupled with said control means for controlling the movements of said frame locating means in said first and second directions, respectively;
each of said subcontrol means respectively including a first register means for memorizing one of said values corresponding to said first or second direction converted by said decoder means, a second register means for memorizing corresponding coordinate values for a previously selected frame, a subtraction circuit coupled to said first and second register means for subtracting said coordinate values stored in said first and second register for establishing a rotational direction of said first and second pulse motors, respectively, comparator means coupled to said subtraction circuit for receiving the absolute value obtained by said subtraction circuit, counter means connected to said comparator pulse emitter for emitting pulses and coupled to said counter means and to said first and second pulse motors, initiating means coupled to said pulse emitter for initiating operation of said pulse emitters for emitting pulses to said pulse motors and for initiating counting by said counter means, whereby said frame location means are moved in said first and second directions, respectively, by said pulse motors, and means coupled between said pulse emitter and said first and second pulse motors and coupld to said comparator for discontinuing the pulses to said motors when said counter means counts up to a number equal to said absolute value stored in said comparator means, whereby said frame location means is brought to rest with the specified frame at a position for projection onto the screen.

2. Microfiche reader means as claimed in claim 1 wherein each of said subcontrol means further includes a speed control circuit connected to said comparator means and to said pulse emitter for lengthening the pulse cycle of pulses emitted by said pulse emitter when said comparator means detects a predetermined value difference between the absolute value and the numbers counted by said counter means, whereby said frame location means is brought to rest gradually.

3. Microfiche reader apparatus as recited in claim 1 wherein said apparatus has a fixed base and said first drive transmission means comprises first shaft means rotatable by said first motor, a plurality of pulleys mounted on said fixed base, and a draw wire having opposite end portions connected to said slidable support table passing around said pulleys and being wound around and driveable by said first shaft means, and said second drive transmission means comprises second shaft means, a further plurality of pulleys mounted on said fixed base on said slidable support table, and on said carrier table, and a draw wire which has one end fixedly attached to a point on a first side of said fixed base is successively passed around a pulley mounted on a first side of said slidable support table, said first side of said slidable support table being the side thereof which is most closely adjacent and parallel to said first side of said fixed base around a pulley mounted on a first side portion of said carrier table nearer to said first side of said fixed base, around another pulley mounted on the first side of said slidable support table, and around pulleys provided at a first corner of said fixed base, led along a second side of said fixed base generally normal to said first side thereof, is wound around said second shaft means, is led to and passed around pulleys provided at a second corner of said fixed base, is led from said second corner and successively passed around a pulley mounted on a third side of said slidable support table which is opposite to said first side thereof, a pulley mounted on an opposite side of said carrier table, and another pulley mounted on the third side of said slidable support, and has the opposite end thereof fixedly attached to a point on a third side of said fixed base which is opposite to said first side thereof.

4. A microfiche reader apparatus which comprises:
a frame location means including a slidable support table movable in a first direction and a carrier table movably mounted on said slidable support table and movable in a second direction which is orthagonal to said first direction;
a first servo motor, first drive transmission means coupled between said first servo motor and said slidable support table for moving said slidable support table in said first direction, a second servo motor, a second drive transmission means coupled between said second servo motor and said carrier table for moving said carrier table in said second direction;
means for inserting a microfiche having a plurality of frames in a rectangular array, said inserting means being positioned adjacent said frame location means and including a pair of microfiche detecting means in a path through which the microfiche is inserted and a transporting means for transporting the microfiche in said path and onto said carrier table, said transporting means being coupled to said detecting means and being operable to transport the microfiche only when both of said pair of detecting means are actuated by the leading end of the microfiche, said frame locating means being brought to an inserting position immediately behind said transporting means for taking in the microfiche onto the carrier table upon insertion of the microfiche;

a projection means adjacent said frame location means for projecting a specific frame of the microfiche onto a screen;

a key means for specifying a specific frame of the microfiche and providing a power output proportional to the frame location of the specified frame; and two servo amplifiers, one coupled to each servo motor, said servo amplifiers being coupled with said key means for controlling the movements of said frame locating means according to the level of the power output from said key means.

5. Microfiche reader apparatus as recited in claim 4 wherein said apparatus has a fixed base and said first drive transmission means comprises first shaft means rotatable by said first motor, a plurality of pulleys mounted on said fixed base, and a draw wire having opposite end portions connected to said slidable support table passing around said pulleys and being wound around and driveable by said first shaft means, and said second drive transmission means comprises second shaft means, a further plurality of pulleys mounted on said fixed base, on said slidable support table, and on said carrier table, and a draw wire which has one end fixedly attached to a point on a first side of said fixed base is successively passed around a pulley mounted on a first side of said slidable support table, said first side of said slidable support table being the side thereof which is most closely adjacent and parallel to said first side of said fixed base around a pulley mounted on a first side portion of said carrier table nearer to said first side of said fixed base, around another pulley mounted on the first side of said slidable support table, and around pulleys provided at a first corner of said fixed base, led along a second side of said fixed base generally normal to said first side thereof, is wound around said second shaft means, is led to and passed around pulleys provided at a second corner of said fixed base, is led from said second corner and successively passed around a pulley mounted on a third side of said slidable support table which is opposite to said first side thereof, a pulley mounted on an opposite side of said carrier table, and another pulley mounted on the third side of said slidable support and has the opposite end thereof fixedly attached to a point on a third side of said fixed base which is opposite to said first side thereof.

* * * * *